United States Patent
Hatta et al.

(10) Patent No.: US 7,085,397 B2
(45) Date of Patent: Aug. 1, 2006

(54) UNFAIR CONTENTS APPROPRIATION DETECTION SYSTEM, COMPUTER PROGRAM AND STORAGE MEDIUM

(75) Inventors: Koichi Hatta, Gunma (JP); Katsumi Ikegami, Gunma (JP)

(73) Assignee: Oki Electric Industry Co. Ltd., Tokyo (JP)

( * ) Notice: Subject to any disclaimer, the term of this patent is extended or adjusted under 35 U.S.C. 154(b) by 618 days.

(21) Appl. No.: 10/183,439

(22) Filed: Jun. 28, 2002

(65) Prior Publication Data

US 2003/0012405 A1 Jan. 16, 2003

(30) Foreign Application Priority Data

Jun. 29, 2001 (JP) ............................ 2001-197623

(51) Int. Cl.
*G06K 9/00* (2006.01)
(52) U.S. Cl. ........................... 382/100; 750/51
(58) Field of Classification Search ............... 380/210, 380/252, 287, 51, 54, 55; 382/100; 713/176; 370/527–529; 750/50, 51, 57
See application file for complete search history.

(56) References Cited

U.S. PATENT DOCUMENTS 5,717,794 A * 2/1998 Koga et al. ................ 382/309
6,112,225 A * 8/2000 Kraft et al. ................ 709/202
6,243,480 B1 * 6/2001 Zhao et al. ................ 382/100

* cited by examiner

*Primary Examiner*—Joseph Mancuso
*Assistant Examiner*—Christopher Lavin
(74) *Attorney, Agent, or Firm*—Venable LLP; Michael A. Sartori (57) ABSTRACT

An unfair contents appropriation detection system capable of efficiently detecting the contents intentionally changed for the worse with ill will. If a contents browser terminal 130 obtains the contents appropriated by a contents appropriator terminal 120, an unfair contents appropriation detection program is incorporated into the above contents appropriated by the contents appropriator terminal. This program transmits alarm information AL to a watcher terminal 140 when a content browser terminal obtains the unfairly appropriated contents from the unfair contents appropriator terminal 120. Furthermore, in this unfairly appropriated contents, there is embedded a digital water mark for obtaining the changed area information of the contents. The watcher terminal obtains the contents from the contents appropriator terminal based on the alarm information AL and executes verification of the digital water mark with regard to the contents as obtained. The changed area of the contents can be automatically detected, thus the efficiency of watching the contents appropriation by the watcher terminal is enhanced.

7 Claims, 9 Drawing Sheets

APOLOGY

INFORMATION OF A FAULTY PRODUCT

Ultra low speed / low reliability Server

UNFAIR CONTENTS APPROPRIATION DETECTION SYSTEM, COMPUTER PROGRAM AND STORAGE MEDIUM

BACKGROUND OF THE INVENTION

1. Field of the Invention

The present invention relates to an unfair contents appropriation detection system, a computer program for detecting unfair contents appropriation, and a storage medium capable of storing the above computer program and being read by the above computer.

2. Description of the Related Art

With the recent world wide spread of the personal computer and the remarkable and rapid development in network technology, year by year an increasing number of business firms have come to make use of networks, such as the internet, for their propaganda activities. The business firms prepare their Web contents (referred to as merely "contents" hereinafter) for use in advertisement of their logo, products and services, and display the contents through their Web server which is basically made accessible for anyone who wishes to browse it. The contents browser is able to access the Web server with the help of certain suitable browsing software to browse the content thereof. In this case, in general, there is no need for the contents browser to ask the permission of the business firm before accessing and browsing the contents. Accordingly, the contents browser is able to obtain (down load) the contents with ease by making use of the function of such browsing software.

As far as the contents browser merely copies and uses the contents offered by the business firm only for the sake of the contents browser's own, this would not cause any disadvantageous problems for the business firm offering the contents offerer. In this case, the contents firm. Accordingly, there would be a lesser possibility that the business firm would be damaged by such a browser's act of copying and using the contents. What is worse, however, since the contents can be changed with ease by means of a certain kind of image compiling software, sometimes a contents browser tries to intentionally change the content for the worse. He tries to change and/or replace the contents for the worse by using such words, phrases, images and so forth to give a very bad impression to other contents browsers, for instance, by replacing words and phrases used in the original contents with corresponding antonyms, by adding a mustache to the face of a beautiful model, and so forth. There would be a high possibility that an intentional unfair act like this would damage the social confidence of the business firm and might even cause social confusion.

In view of the situation as described above, a need exists for a means for detecting contents intentionally changed with malicious intent, especially means for detecting only unfairly changed and appropriated contents without picking out the contents just copied and used.

SUMMARY OF THE INVENTION

According to the first aspect of the invention, there is provided an unfair contents appropriation detection system including a contents offerer terminal offering the contents; a contents appropriator terminal obtaining and appropriating the contents offered by the contents offerer terminal; a contents browser terminal obtaining and browsing the contents offered by the contents offerer terminal and/or the contents appropriated by the contents appropriator terminal and transmitting the predetermined alarm information when obtaining the contents appropriated by the contents appropriator terminal; and a watcher terminal detecting the contents appropriation executed by the contents appropriator terminal based on the alarm information transmitted from the contents browser terminal, and if the appropriated contents are unfairly changed, sending a report to that effect to the contents offerer terminal, wherein if the contents browser terminal obtains the contents appropriated by the contents appropriator terminal, a contents appropriation detection program is incorporated into the appropriated contents obtained by the contents browser terminal, and transmits the predetermined alarm information to the watcher terminal.

According to the second aspect of the invention, there is provided an unfair contents appropriation detection system including a watcher terminal developing a digital water mark embedment tool for embedding a digital water mark in the contents and also developing a screen saver preparation tool for making a predetermined screen saver; a contents offerer terminal receiving the digital water mark embedment tool from the watcher terminal to offer the contents in which the digital water mark is embedded, and also receiving the screen saver preparation tool from the watcher terminal to prepare a screen saver capable of detecting the digital water mark embedded contents; a contents appropriator terminal obtaining and appropriating the contents offered by the contents offerer terminal; and a contents browser terminal obtaining and browsing the contents offered by the contents offerer terminal and/or the contents appropriated by the contents appropriator terminal, and receiving the screen saver from the contents offerer terminal to start up the screen saver, wherein the screen saver has accesses in sequence to the contents made open to the network to detect the digital water mark embedded contents and transmits the predetermined alarm information to the watcher terminal.

According to the third aspect of the invention, there is provided a computer program which is stored in a contents browser terminal and gains accesses in sequence to the contents made open to the network to detect the contents in which a predetermined digital water mark is embedded and transmits the predetermined alarm information to the watcher terminal. This computer program or the screen saver into which this program is incorporated can be the object of the electronic commercial transaction on the network. Also, if this program is stored in pertinent storage medium such as a CD-ROM, the program can be the object of the ordinary commercial transaction as a tangible item.

According to the fourth aspect of the invention, there is provided an unfair contents appropriation detection system including a watcher terminal developing a digital water mark embedment tool for embedding a digital water mark to the contents and also developing an appropriation detection program capable of detecting the digital water mark embedded contents; a contents offerer terminal receiving the digital water mark embedment tool from the watcher terminal to offer the digital water mark embedded contents; a contents appropriator terminal obtaining and appropriating the contents offered by the contents offerer terminal; a provider terminal storing and providing the contents offered by the contents offerer terminal and the contents appropriated by the contents appropriator terminal as well, and receiving and incorporating the appropriation detection program from the watcher terminal; and a contents browser terminal obtaining and browsing the contents offered by the contents offerer terminal, wherein the contents appropriation detection program detects the contents with the digital water mark as embedded therein from among the contents inputted to/outputted from the provider terminal or the contents stored in the provider terminal, and transmits the predetermined alarm information to the watcher terminal.

According to the fifth aspect of the invention, there is provided a computer program which is stored in a provider terminal and detects the contents in which a predetermined digital water mark is embedded among from the input/output contents to/from the provider terminal or the contents stored in the provider terminal, and transmits the predetermined alarm information to the watcher terminal. This computer program can be the object of the electronic commercial transaction on the network. Also, if this program is stored in pertinent storage medium such as a CD-ROM, the program can be the object of the ordinary commercial transaction as a tangible item.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings.

DETAILED DESCRIPTION OF THE PREFERRED EMBODIMENTS

An unfair contents appropriation system (referred to as merely "The System" hereinafter) according to the invention and peripheral techniques related thereto will now be described in detail by way of several exemplary examples and with reference to the accompanying drawings. In this specification as well as in each of several figures of the accompanying drawings, the constituents of the invention having substantially like function and constitution are designated by the like reference numeral and character for avoiding redundant repetitive description thereabout.

FIRST EMBODIMENT

Figure 1:
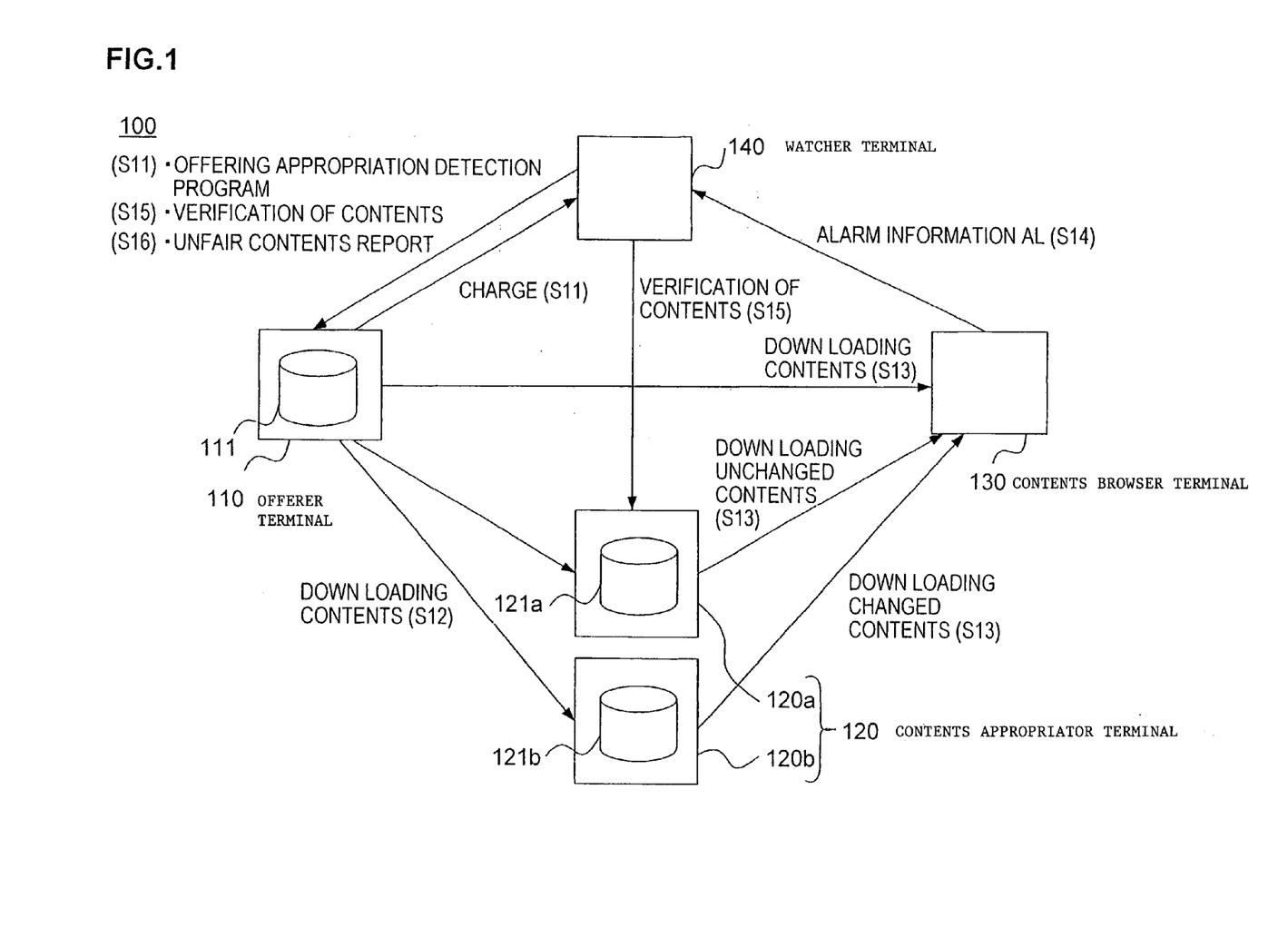
FIG. 1 is a block diagram for explaining the entire constitution of an unfair contents appropriation detection system according to the first embodiment of the invention.

Referring to FIG. 1, The System 100 is made up of an original contents offerer terminal 110, a contents appropriator terminal 120 (120*a*, 120*b*), an ordinary contents browser terminal 130, and a watcher terminal 140. These terminals 110, 120, 130, and 140 are mutually connected by means of a network, such as an internet. In FIG. 1, each terminal is indicated in the single form. However, this is an example to promote easy understanding, and one skilled in the art would naturally understand that a greater number of these terminals exist in actual networks.

The System 100 works as follows. When the contents offered by the contents offerer terminal 110 are appropriated by the contents appropriator terminal 120 and the appropriated contents are made open to the ordinary contents browser terminal 130 by the appropriator, the watcher terminal 140 detects and reports it to the contents offerer terminal 110. In this case, the watcher terminal 140 and the contents offerer terminal 110 make a contract with each other such that the former is able to receive a watching service charge from the latter.

Each terminal and the operation thereof will be described in detail in the following.

(Contents Offerer Terminal 110)

The contents offerer terminal 110 is a terminal belonging to a business firm whose propaganda activities are carried out, for instance, by creating their own contents and making it open to the network. The object of The System 100 is to prevent unfair appropriation of the contents offered by the contents offerer terminal 110. As will be described later, the contents offerer terminal 110 makes a contract with a watcher terminal to have the latter watch the unfair appropriation of the contents on the network. The computer program for detecting unfair contents appropriation (referred to as "unfair contents appropriation detection program" hereinafter) is provided from the watcher terminal 140 to the contents offerer terminal 110 with a predetermined payment based on the above contract (Step S11). In this sense, it can be said that the contents offerer terminal 110 is one of the client terminals of the watcher terminal 140.

The contents are stored in the Web server 111 of the contents offerer terminal 110. The contents include HyperText Mark-up Language (HTML) files, graphic files and so forth, and also include the unfair contents appropriation detection program, which is provided from the watcher terminal 140. While the contents are down loaded to the terminals (the contents appropriator terminal 120 or the ordinary browser terminal 130, for instance) on the network, the above unfair contents appropriation detection program is also down loaded to those terminals along therewith. The unfair contents appropriation detection program has a function of transmitting the predetermined alarm information AL to the watcher terminal 140 when the ordinary contents browser terminal 130 obtains the contents appropriated by the contents appropriator terminal 120 as described later. The alarm information AL may be sent to the watcher terminal 140 by means of an E-mail, a User Datagram Protocol (UDP), and so forth.

(Contents Appropriator Terminal 120)

The contents appropriator terminal 120 is the terminal that is used by the appropriator who down loads and appropriates the contents from the Web server 111 of the contents offerer terminal 110. For a better understanding of the following description, it is assumed that the contents appropriator terminal 120 includes two kinds of contents appropriator terminals, one being a contents appropriator terminal 120a and the other being a contents appropriator terminal 120b. The contents appropriator terminal 120a appropriates the original contents offered by the contents offerer terminal 110 without adding any change thereto, while the contents appropriator terminal 120b appropriates the original contents by changing the HTML file and the graphic file contained therein. In the following explanation, the change of the HTML file and the graphic file are generally called "change of the contents." Furthermore, although the present specification specifically describes the case of changing the graphic file in the contents, it is to be understood that "change of the graphic file" is used to expresses the same meaning as "change of the contents."

The contents appropriator terminal 120a down loads the contents offered by the contents offerer terminal 110 (Step S12) and then uploads his down loaded contents to his own Web server 121a or to an internet provider to which he subscribes, without adding any change to his down loaded contents. On one hand, the contents appropriator terminal 120b down loads the contents offered by the contents offerer terminal 110 (Step S12), adds certain changes to his down loaded contents, and then uploads his changed contents to his own Web server 121b or to an internet provider to which he subscribes.

In order to enable ordinary contents browser terminals 130 to browse the above contents uploaded to the Web servers 121a and 121b, the contents appropriator terminals 120a and 120b register the addresses of their own Web servers 121a and 121b to a search server or the equivalent, thereby trying to guide ordinary contents browser terminals 130 to access Web servers 121a and 121b.

(Contents Browser Terminal 130)

The contents browser terminal 130 is an ordinary Web browser terminal existing on the network. The ordinary contents browser terminal 130 down loads and browses the contents offered by the contents offerer terminal 110 and the contents appropriated by the contents appropriator terminal 120 by making use of the above search server to trace the Web link (Step S13). While the contents are down loaded, the unfair contents appropriation detection program as contained in the contents is down loaded together with the contents.

The unfair contents appropriation detection program starts its operation as soon as it is down loaded to the ordinary contents browser terminal 130, and verifies an address of the Web server, from which the contents are down loaded, that is, a source of down loaded contents. In this case, the term "address" is an identifier assigned to the Web server in the network, and in the network, it means an Internet Protocol (IP) address, a Uniform Resource Locator (URL), and so forth. The unfair contents appropriation detection program carries out the following processing based on the address verification result of the Web server, i.e., the source of down loaded contents.

(1) If it is verified that the contents are down loaded from the right Web server 111 of the contents offerer terminal 110, the unfair contents appropriation detection program does not output alarm information AL.

(2) If it is verified that the contents are down loaded from the other than right Web server 111 of the contents offerer terminal 110, the unfair contents appropriation detection program outputs an alarm information AL to the watcher terminal 140 (Step S14). At this time, the alarm information AL includes such information as the date and time when the ordinary contents browser terminal 130 has down loaded the contents, the address of the Web server as the source of the down loaded contents, the address of the right Web server 111 of the contents offerer terminal 110, and so forth.

(Watcher Terminal 140)

The watcher terminal 140 makes a contract with the contents offerer terminal 110 to watch the appropriation of the contents by the contents appropriator 120, and reports it to the contents offerer terminal 110 when the offered contents are unfairly changed by the contents appropriator 120. The watcher terminal 140 prepares the above-mentioned unfair contents appropriation detection program for use in the contents of the contents offerer terminal 110 and supplies it to the contents offerer terminal 110 (Step S11).

The watcher terminal 140 detects the existence of the Web server 121 of the contents appropriator terminal 120 based on the alarm information AL transmitted from the ordinary contents browser terminal 130. Detecting the existence of the Web server 121 of that contents appropriator 120, the watcher terminal 140 down loads the contents of the Web server 121 of the contents appropriator terminal 120 and the contents of the right Web server 111 of the contents offerer terminal 110, and compares both of those contents with each other (Step S15). If it is noted from this comparison that the contents from the contents appropriator terminal 120 are unfairly changed, the watcher terminal 140 sends a report on this unfair change of the contents to the contents offerer terminal 110.

As explained above, according to the first embodiment of the invention, there is provided an unfair contents appropriation detection program which is incorporated into the contents as down loaded, thereby verifying whether the Web server used as the source of the down loaded contents is a right Web server or not. Furthermore, the contents as down loaded having been appropriated, the above program has the watcher terminal 140 issue the alarm information AL enabling detection of the contents appropriator terminal 120 appropriating the contents.

SECOND EMBODIMENT

As described above, The System 100 according to the first embodiment of the invention is constituted such that if the ordinary contents browser terminal 130 down loads the contents from the Web server 121 of the contents appropriator terminal 120, the unfair contents appropriation detection program issues the alarm information AL from the ordinary contents browser terminal 130 to the watcher terminal 140 to warn that a certain contents appropriation is taking place in the down loaded contents. In this case, if this alarm information AL itself is provided with enough detail to show how the contents as down loaded are appropriated, there would be no problem. If not enough is provided, however, things are not as simple. That is, before definitely showing how the contents as down loaded have been actually appropriated, the watcher terminal 140 has to carry out a detailed comparison study with respect to the contents of the Web server 111 of the right contents offerer terminal 110 and the contents of the Web server 121 of the contents appropriator terminal 120, including the detailed visual comparison over the graphic files. This would be very time consuming work.

On one hand, there might exist a contents appropriator like the contents appropriator terminal 120a, who merely copies the contents from the original without adding any change thereto. In this case, the contents appropriator might come to rather assist the advertisement activities of the contents offerer terminal 110, so that there is a lesser possibility that the contents offerer terminal 110 suffers disadvantages from such appropriation. To the contrary, the contents appropriator terminal 120*b*, who makes use of the contents including his intentional changes added thereto, would not only harm the advantage on the side of contents offerer terminal 110 but also cause a certain social confusion. In the following, from the aspect as described above, there will be explained the second embodiment of the invention which is able to more effectively detect the contents appropriator terminal 120*b* who changes the original contents and makes use of the changes.

The second embodiment of the invention is characterized by a detectable digital water mark which is embedded in the contents offered by the contents offerer terminal 110. With provision of this digital water mark, more accurate detection of the changed portion in the contents is very much facilitated. The second embodiment will now be described with reference to FIG. 2. The substantial part of the second embodiment, such as the constitution of The System, is similar to that of the first embodiment as described above, so that repetitive explanation thereabout will be omitted.

Figure 2:
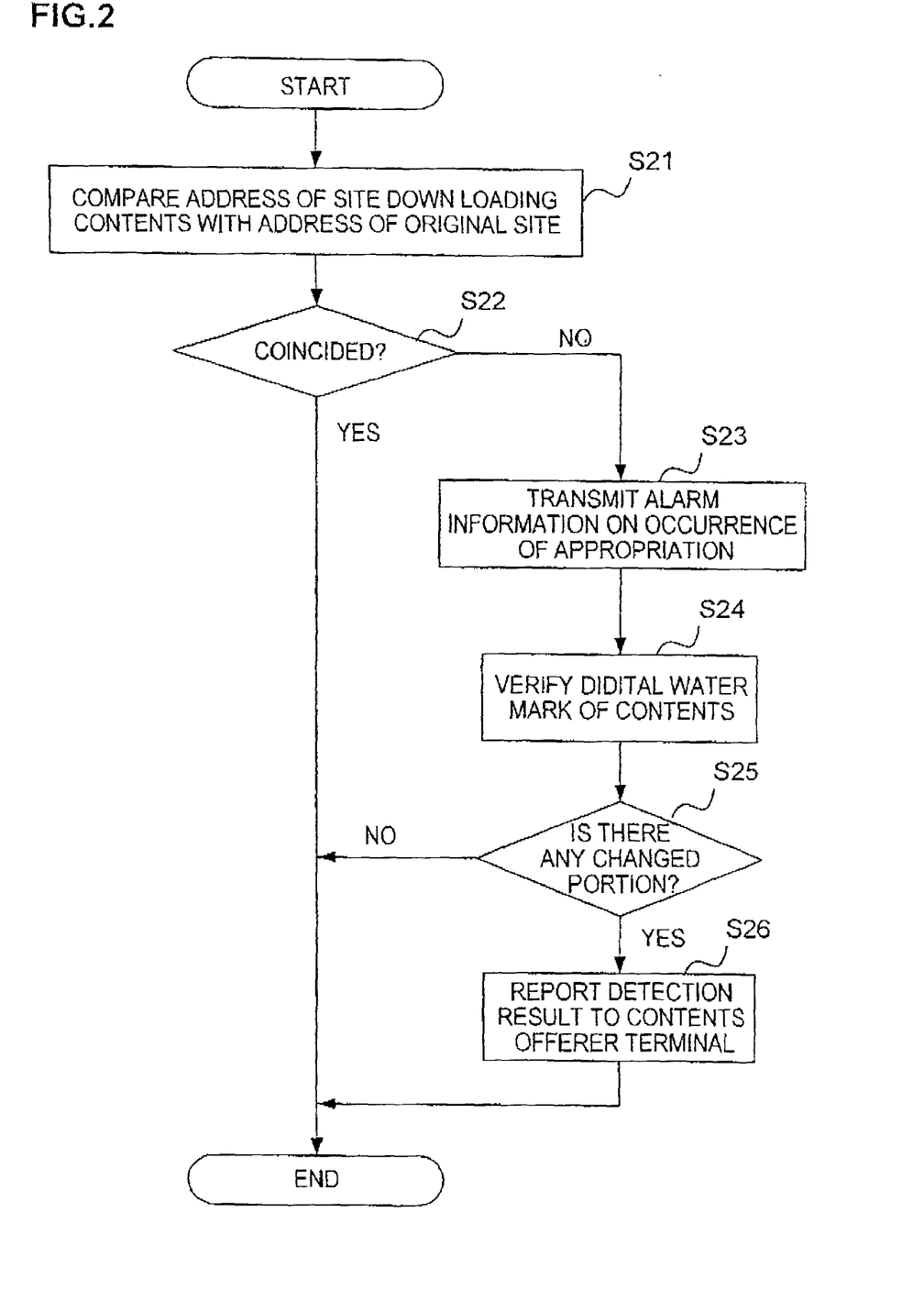
FIG. 2 is a flow chart showing the detection operation of an unfair contents appropriation detection system according to the second embodiment of the invention.

At first, the unfair contents appropriation detection program starts its operation as soon as it is down loaded to the ordinary contents browser terminal 130. Then, it is verified whether or not the address of the Web server as the source of the down loaded contents coincides with the address of the Web server 111 of the contents offerer terminal 110 (Step S21). If the address of the Web server as the source of the contents as down loaded coincides with the address of the Web server 111 of the right contents offerer terminal 110 (Step S22), the unfair contents appropriation detection program terminates its operation without transmitting any alarm information AL.

On one hand, if the address of the Web server as the source of the down loaded contents does not coincide with the address of the Web server 111 of the right contents offerer terminal 110, it is determined that the contents as down loaded are contents that are appropriated by the contents appropriator terminal 120. Then, the unfair contents appropriation detection program issues the alarm information AL to the watcher terminal 140 to notify that the contents as down loaded are appropriated (Step S23).

The watcher terminal 140 having received the alarm information AL down loads the contents of the Web server 121 of the contents appropriator terminal 120 as identified based on the alarm information AL, and then, executes inspection of the digital water mark included in the appropriated contents as down loaded (Step S24), by which the changed portion included in the appropriated contents is revealed and detected. If the contents do not include a changed portion (Step S25), there is no need for the contents to be visually compared with the original contents.

Figure 3:
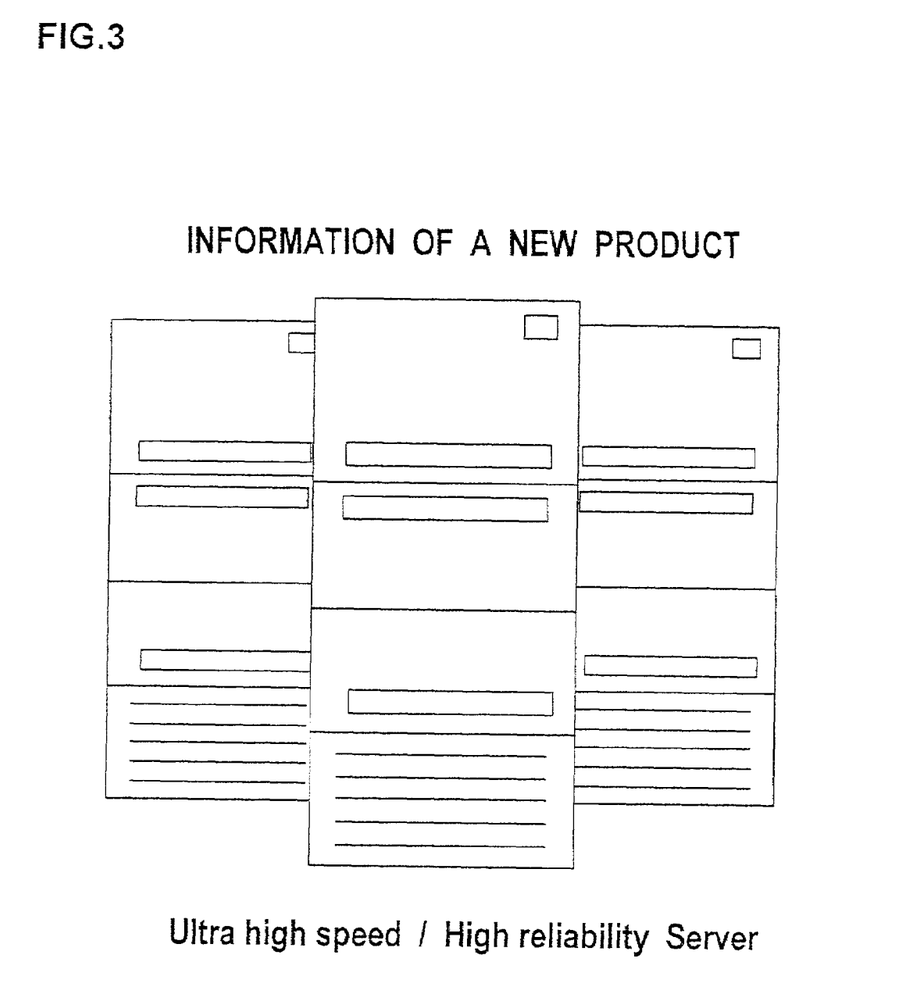
FIG. 3 is an illustration showing an example of the contents offered by a contents offerer terminal.
Figure 4:
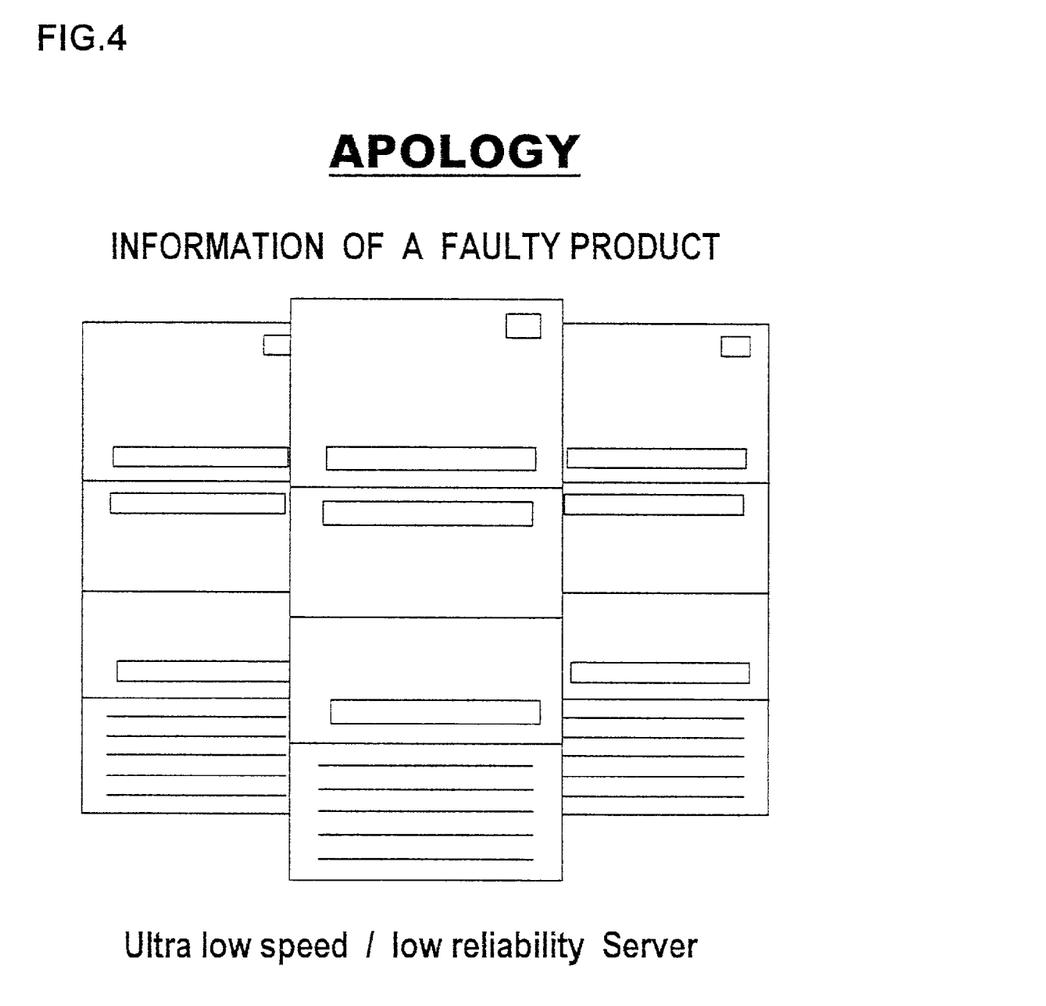
FIG. 4 is an illustration showing an example obtained by maliciously changing the contents as shown in FIG. 3.
Figure 5:
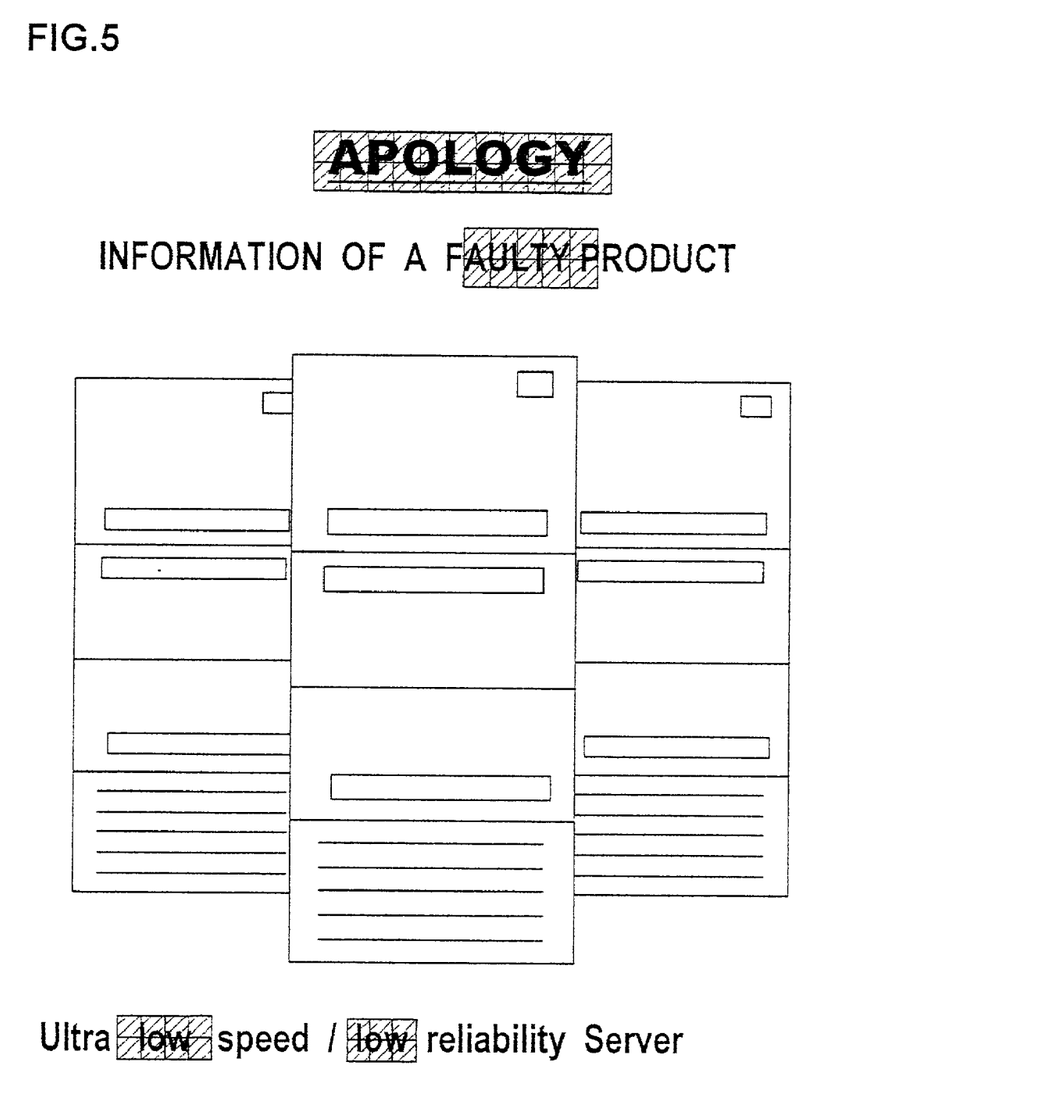
FIG. 5 is an illustration showing another example obtained by maliciously changing the contents as shown in FIG. 3.

On one hand, if it is found in the Step 25 that the contents are changed, it is good enough to visually compare only the changed portion as detected with the original contents. FIG. 3 shows an example of the original contents offered by the contents offerer terminal 110. FIG. 4 shows an example of the contents changed by the contents appropriator terminal 120*b*. FIG. 5 shows the state of the contents after inspecting the changed contents as shown in FIG. 4 by making use of the digital water mark according to the second embodiment. As will be seen from the example of FIG. 4, various changes are carried out with respect to the original contents as shown in FIG. 3. To put it concretely, an "apology" is newly added while terms "new product," "ultra high speed" and "high reliability" are respectively changed to "faulty product," "ultra low speed" and "low reliability." In case of inspecting whether or not a change is made in the contents as shown in FIG. 4, it is required to visually compare in detail the graphic file with the original contents. However, in case of the contents as shown in FIG. 5, changed portions can be identified at a first glance owing to use of the digital water mark.

The watcher terminal 140 having identified the changed portions sends a report to the effect that the contents are changed and appropriated, to the contents offerer terminal 110 (Step S26).

As explained above, according to The System of the invention, if existence of the changed contents is reported to the watcher terminal 140 by means of the alarm information AL, the portion of the contents (graphic file) which is changed can be inspected within the watcher terminal 140. Consequently, there is no need for the unchanged contents (graphic file) to be visually ascertained. This produces such a good effect that inspection of the changed portion can be completed by inspecting only the designated portion. In this way, the work of visually comparing the right contents of the contents offerer terminal 110 with the changed contents of the contents appropriator terminal 120 can be made very effective.

THIRD EMBODIMENT

Similar to the second embodiment as described above, in the third embodiment of the invention, the digital water mark capable of detecting the changed portion of the contents is embedded in the contents offered by the contents offerer terminal 110. Furthermore, a function of inspecting the digital water mark is added to the unfair contents appropriation detection program. In this way, the third embodiment is characterized in that information regarding the changed portion of the contents is incorporated into the alarm information AL. The third embodiment will now be described with reference to FIG. 6. The substantial part of the third embodiment such as the constitution of The System is similar to that of the first embodiment as described above, so that the repetitive explanation thereabout will be omitted.

Figure 6:
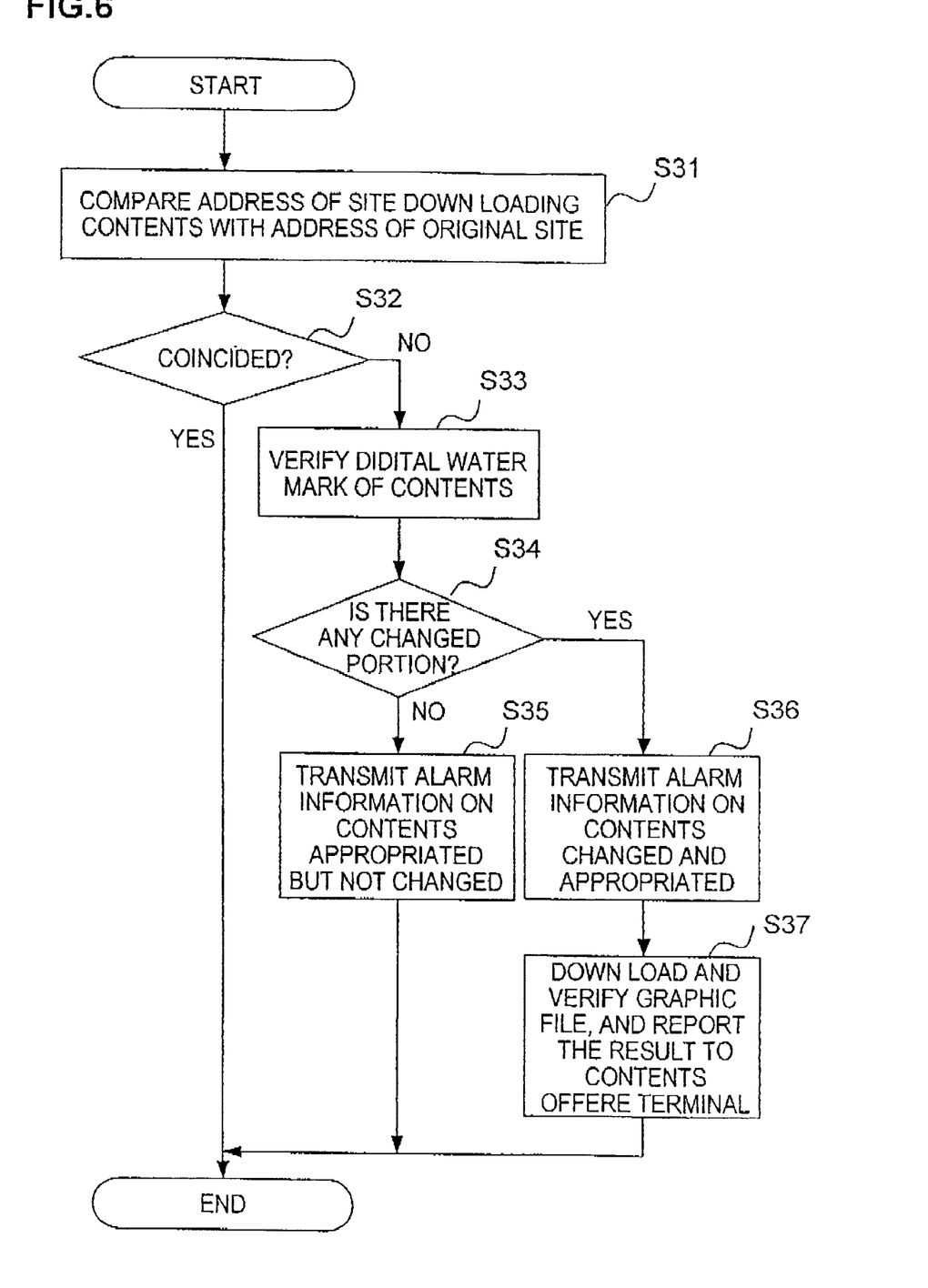
FIG. 6 is a flow chart showing the detection operation of an unfair contents appropriation detection system according to the third embodiment of the invention.

To begin with, the unfair contents appropriation detection program starts its operation as soon as it is down loaded to the ordinary contents browser terminal 130. Then, it is verified whether or not the address of the Web server as the source of the down loaded contents coincides with the address of the Web server 111 of the contents offerer terminal 110 (Step S31). If the address of the Web server as the source of the down loaded contents coincides with the address of the Web server 111 of the right contents offerer terminal 110 (Step S32), the unfair contents appropriation detection program terminates its operation without transmitting any alarm information AL.

On one hand, if the address of the Web server as the source of the down loaded contents does not coincide with the address of the Web server 111 of the right contents offerer terminal 110 in Step S32, it is determined that the contents as down loaded is the contents that are appropriated by the contents appropriator terminal 120. In the third embodiment, the digital water mark included in the above appropriated contents is inspected by the above-mentioned newly added function (Step S33).

Whether or not the contents are changed is judged by inspection of the digital water mark contained in the contents by means of the unfair contents appropriation detection program (Step S34). If the contents are not changed, an alarm information AL to the effect that the contents are appropriated but not changed, is transmitted to the watcher terminal 140 (Step S35). If the contents are not changed, there is no need for the watcher terminal 140 to carry out any visual comparison of the contents. Accordingly, there is no need for the watcher terminal 140 to down load the contents from the contents appropriator terminal 120.

On one hand, in Step S34, if the contents are changed, the alarm information to the effect that the contents are changed and appropriated is transmitted to the watcher terminal 140 (Step S36). The alarm information AL transmitted to the watcher terminal 140 includes such information as the date and time when the ordinary contents browser terminal 130 has down loaded the contents, the address of the Web server as the source of the down loaded contents, the address of the server 111 of the right contents offerer terminal 110, and also the information with regard to the changed portion of the contents.

In the watcher terminal 140 having received the alarm information AL, the contents of the Web server 121 of the contents appropriator terminal 120 are down loaded based on the alarm information AL and then, the changed portion of the down loaded contents is ascertained. The changed portion having been verified, a report to the effect that the contents are changed and appropriated is sent to the contents offerer terminal 110 (Step S37).

In The System according to the third embodiment, if the ordinary contents browser terminal 130 down loads the appropriated contents, not only the information relating to existence of the contents appropriator terminal 120 but also the information relating to the changed portion of the contents are transmitted together to the watcher terminal 140 as the alarm information AL. Therefore, the following advantageous effects can be obtained. That is:

If the contents are not changed, it is not needed to down load the contents from the Web server 121 of the contents appropriator terminal 120.

The changed contents may be ascertained by checking only portions as pointed out based on the changed area information.

With this, the visual comparison work comparing the contents of the right Web server with the contents of the unfair appropriator can be made more efficient and facilitated.

FOURTH EMBODIMENT

The fourth embodiment according the invention is similar to the third embodiment as described above with respect to the processing steps until the step of transmitting the alarm information AL to the watcher terminal 140. This embodiment is characterized by the processing after the alarm information AL is received by the watcher terminal 140.

Figure 7:
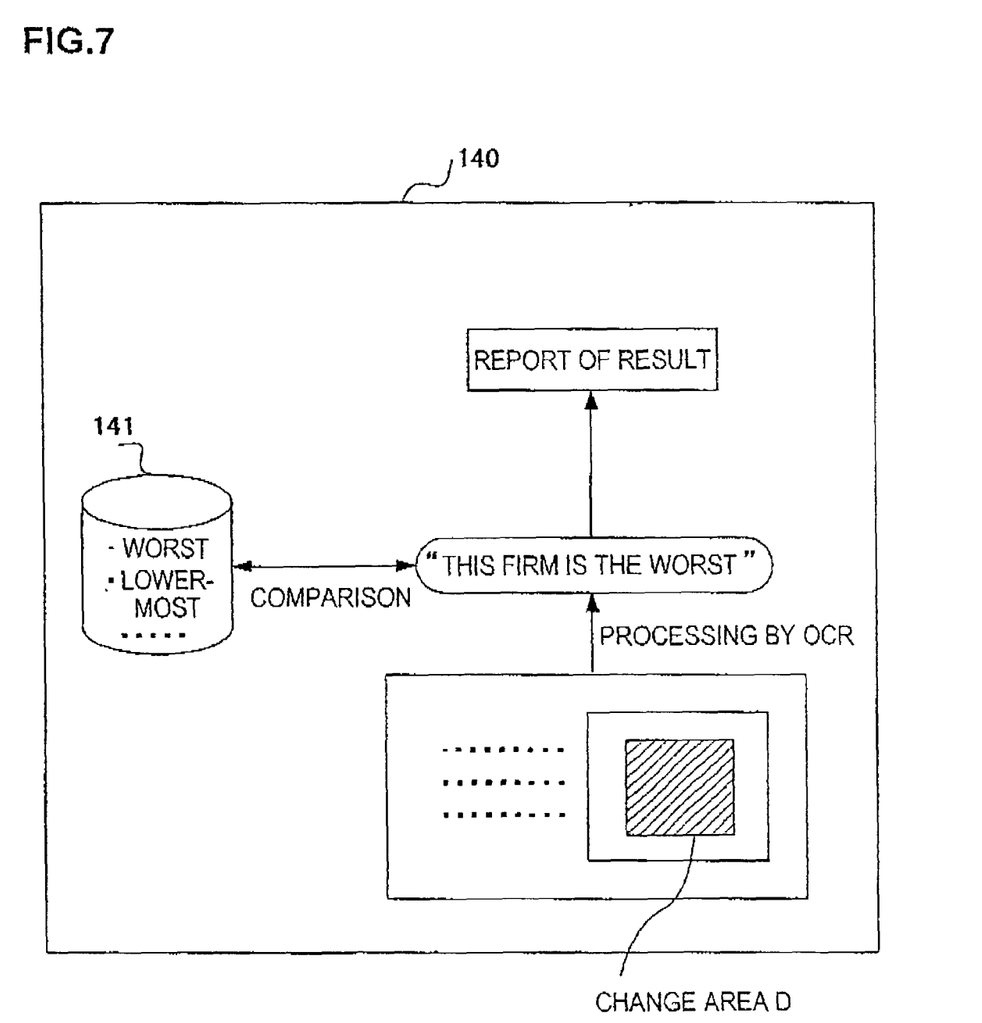
FIG. 7 is an illustration for explaining a watcher terminal in an unfair contents appropriation detection system according to the fourth embodiment of the invention.

The processing carried out in the watcher terminal 140 will now be explained with reference to FIG. 7.

In the watcher terminal 140, the character recognition processing is made applicable to a changed area (shown by a sign "D" in FIG. 7) which is obtained from the alarm information AL. This character recognition processing may be carried out with the help of the Optical Character Reader (OCR), for instance.

In the fourth embodiment, various libelous words and phrases (referred to as "dangerous words" hereinafter) which very often come out in maliciously changed contents, are registered in advance in a dangerous words database 141. Some examples of dangerous words are enumerated in the following for reference.

In case of the contents relating to food:
unsanitariness, filth, nasty, hot, salty and so forth.

In case of the contents relating to electrical and electronic products:
defect, inferior, electric leak, electric shock, fuming, ignition, combustion and so forth.

In case of the contents relating to service business:
unfriendliness, arrogance, persistent, expensive and so forth.

If the alarm information AL is transmitted to the watcher terminal 140 from the contents browser terminal 130 by means of The System as described in the third embodiment, the following processing is carried out in the watcher terminal 140.

Before visually specifying which portion of the contents is changed, based on the alarm information AL, the character recognition processing is carried out over the changed area D of the contents, thereby automatically determining whether or not words and phrases coinciding with the dangerous words registered in the dangerous words database are included in the changed area D.

If the dangerous words exist in the contents, it is automatically determined that there is a high possibility that the entire contents of this Web server 121 might maliciously libel the right original contents offerer and a report to that effect is sent to a person in charge of actually comparing the changed contents with the right original contents.

According to The System of the fourth embodiment, if the ordinary contents browser terminal 130 browses the contents of the Web server 121 of the contents appropriator terminal 120, transmitted to the watcher terminal 140 are not only the alarm information AL advising that the Web server 121 exists, but also the information relating to the changed portion of the contents. Consequently, it becomes unnecessary to visually verify the unchanged portion.

Furthermore, with regard to the processing of the changed contents, such an effect is obtained that verification of the changed contents can be completed by verifying only the portion as pointed out in the alarm information AL.

Still further, the fourth embodiment may provide such an advantageous feature that, with execution of the character recognition processing over the changed area of the contents and the comparison of the contents with dangerous words registered in advance in the database thereof, it becomes possible to grasp how dangerous the contents changed by the contents appropriator terminal 121 are, before executing the visual verification of the changed contents. Still further, even if it is reported that a plurality of unfair contents appropriations take place at the same time, it becomes possible to grasp which contents appropriator terminal 120 is the most dangerous against the contents offerer terminal 130 by making use of the above feature. Accordingly, the watcher terminal 140 more efficiently carries out its job owing to this feature.

FIFTH EMBODIMENT

In the unfair contents appropriation detection program as used in the first through fourth embodiments as described above, the contents (graphic data) and the appropriation detection program are independently constituted, so that if the contents appropriator has ability to make a web page to a certain extent, he would be able to delete the appropriation detection program from the HTML data. In this case, the contents appropriator would be able to use his own ability of making a graphic copy (screen copy) to copy an image displayed before him and appropriate the copy for his own use.

Furthermore, the first through fourth embodiments have been described so far on the assumption that even if the contents offered by a business firm are copied and used by a mere copying act, disadvantages the business firm receives would be small. However, there is a possibility that even a mere contents copying act would give a not ignorable disadvantage to the business firm as the contents offerer. For instance, if an unfair business firm dealing imitations of a certain product with a famous registered trademark (brand) pastes that famous registered trademark to their sales promotion Web page, innocent general Web browsers might take the imitation for an authentic famous product. In this case, persons including executives of the famous company who are responsible for administration of their trademarks would be severely accused of failure in protecting the theft of the trademark.

In view of the background as described above, further advanced systems for detecting unfair contents appropriation according to the fifth and sixth embodiments of the invention will be explained in the following with reference to FIGS. 8 and 9. These systems make it possible to detect the unfair contents appropriation, preventing the appropriation detection program from being deleted out of the contents. Furthermore, they also make it possible to more efficiently detect the appropriation of a mere contents copy.

Figure 8:
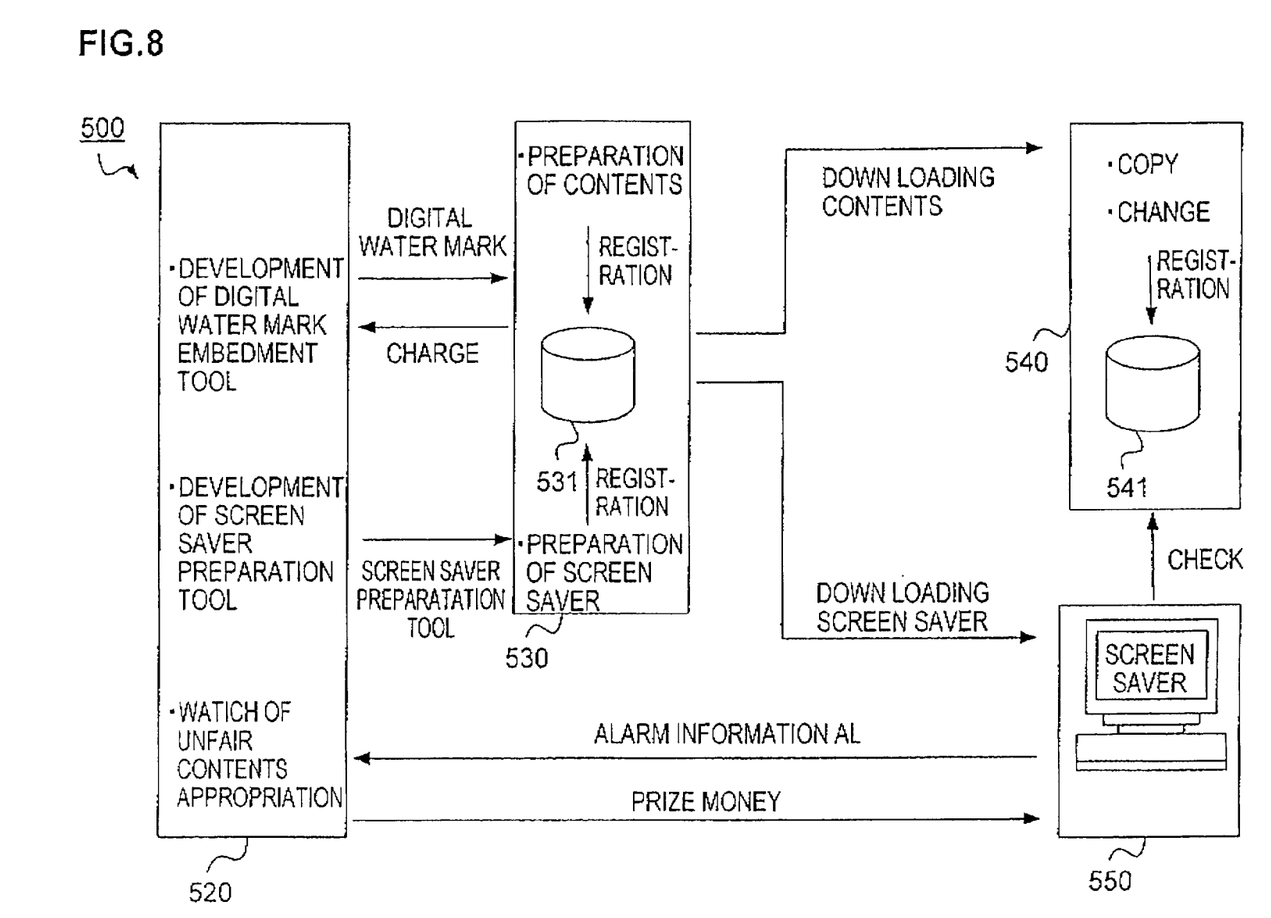
FIG. 8 is a block diagram for explaining the entire constitution of an unfair contents appropriation detection system according to the fifth embodiment of the invention.

Referring to FIG. 8, a system for detecting the unfair contents appropriation (again referred to as "The System" hereinafter) 500 is constituted to include a watcher terminal 520, a contents offerer terminal 530, a contents appropriator terminal 540 and a content browser terminal 550. Each of terminals 520, 530, 540 and 550 are mutually connected with each other by means of a network like the internet. Each of these terminals will be explained in the following.

(Watcher Terminal 520)

The watcher terminal 520 develops a tool for embedding a digital water mark (referred to as digital water mark embedment tool hereinafter) in the contents and provides the tool for the contents offerer terminal 530 that will be described later. There are two kinds of digital water marks which can be embedded in the contents.

(1) Digital Water Mark for Use in Protection of the Contents

This is a digital water mark that is used for embedding special information in a graphic data. This information can be detected from even a part of the image but also even after adding compression to the image data by means of Joint Photographic Expert Group (JPEG).

(2) Digital Water Mark for Detecting Falsification

This corresponds to the digital water mark capable of detecting the changed portion of the contents as explained in connection with the second through fourth embodiments.

The digital water mark embedment tool first embeds the above contents protection digital water mark (1) and then embeds the above falsification detection digital water mark (2). The information embedded in the graphic data by the contents protection digital water mark includes the name of the contents offerer (business firm), the IP address where the graphic data is to be rightfully made open or the information specifying the URL.

The watcher terminal 520 is paid a charge for the digital water marks by the contents offerer terminal 530. The charge may be set per contents using the tool or per a term using the tool, for instance. The System as shown in FIG. 8 includes only one watcher terminal, but it may be provided with a plurality of watcher terminals corresponding to differences in a method of embedding the digital water mark, for instance, like a watcher terminal for A method, a watcher terminal for B method, a watcher terminal for C method and so forth.

Furthermore, the watcher terminal 520 develops a tool for preparing a screen saver capable of detecting the above digital water mark embedded contents (referred to as "screen saver preparation tool" hereinafter). In this screen saver, there are included a program for verifying the digital water mark and the information of the above contents protection digital water mark (the name of the contents offerer (business firm), the IP address where the graphic data is to be rightfully made open or the information specifying the URL). The appropriated contents can be detected by comparing the doubtful contents with such information. This screen saver preparation tool is delivered to the content offerer terminal 530 without any expense.

The watcher terminal 520 stores the alarm information AL sent out from the screen saver started up on the contents browser terminal 550 and investigates the situation where the contents on the network are copied and/or changed based on the above stored alarm information. If the contents are unfairly changed by the contents appropriator 540, a report to that effect is sent to the contents offerer terminal 530. With the constitution of The System, it becomes unnecessary for the watcher terminal 520 to search the contents on the network all by itself.

The watcher terminal 520 pays prize money to the contents browser terminal 550 having provided the useful information making big contribution to the discovery of the unfairly changed contents. The prize money is paid out of the reward the watcher terminal 520 has received from the contents offerer terminal 530 as the charge for the digital water mark embedment tool.

(Contents Offerer Terminal 530)

The contents offerer terminal 530 is a terminal owned by a business firm who creates and use the contents for their advertisement activities. The contents offerer terminal 530 is furnished with the digital water mark embedment tool by the watcher terminal 520 and the former pays the charge for that tool to the latter. The contents offerer terminal 530 creates the contents and embeds necessary digital water marks therein with the help of the digital water mark embedment tool and then, registers the contents to its own server 531 in order to publicly open the contents to the ordinary contents browser terminal 550. The publicly made open contents would be down loaded not only by the ordinary contents browser terminal 550 or by the contents appropriator terminal 540.

Furthermore, the contents offerer terminal 530 is furnished with the screen saver preparation tool by the watcher terminal 520 and prepares the screen saver capable of detecting the contents containing the digital water mark embedded therein. This screen saver can be used as medium for advertisement. Especially, if preparing such a screen saver as calls the attention of the ordinary contents browser terminal 550, the effect of the advertisement will be further enhanced. The contents offerer terminal 530 registers this screen saver to its own server 531 in order to publicly open it. The screen saver is down loaded by the ordinary contents browser terminal 550.

(Contents Appropriator Terminal 540)

The contents appropriator terminal 540 down loads the contents as publicly made open by the contents offerer terminal 530. After adding a certain change to the above contents as made open, the content appropriator terminal 540 registers the changed contents to its own server 541 in order to publicly open the changed content.

(Contents Browser Terminal 550)

The contents browser terminal 550 is a terminal for down loading and browsing the contents existing on the network. In the present (fifth) embodiment, it is assumed that the contents browser terminal 550 is connected with the network throughout the day. To the contents browser terminal 550 is the above screen saver capable of detecting the digital water mark embedded contents delivered and down loaded without paying any expense.

Even if the contents browser terminal 550 is not used, the screen saver works to check the contents within the network one after another by making use of the search site. Accordingly, the sites as located through the world come to be checked by a lot of the contents browser terminals 550. While the screen saver is in operation, it is possible to make propaganda for the contents offerer terminal 530 as the additional information.

In the next, there will be explained the function of the screen saver.

(1) First of all, the screen saver has the function of deciding the URL to be searched as follows. That is, it is decided to use the URL which is provided by the watcher terminal 520 and includes suspicious sites, in other words, Web sites which the watcher terminal 520 wishes to specially watch, or the URL which is decided at random by making use of the search site, or URL which is arbitrarily set by the contents browser terminal 550.

(2) When the screen saver is started up in the contents browser terminal 550, the URL as decided in (1) is referred to.

(3) It is examined if any image is included in the URL as referred to or not.

(4) If included, it is examined if the contents protection digital water mark for this image contents exists or not.

(5) If the contents unfairly appropriated is detected, it compares the detected with the information (contents creator (name of the business firm), the IP address where the graphic data is to be rightfully made open or the information specifying the URL) of the above content protection digital water mark.

(6) If the URL of the contents of the contents offerer terminal 530 (i.e. the URL included in the contents protection digital water mark as the information to indicate the rightful location where the contents are to be placed) is different from the URL being referred to by the contents browser terminal 550 (i.e. the URL indicating the location where the contents are actually placed), the alarm information AL is transmitted to the watcher terminal 520.

(7) Thereafter, there is executed the same processing as executed in the first through fourth embodiment.

(8) If unfairly appropriated contents are not detected, it is further examined whether or not a further link exists with respect to the contents as displayed.

(9) If unfairly appropriated contents exist, it is examined with reference to the corresponding URL.

(10) If the further link exists with regard to the contents, another new check work is started by means of the newly provided another URL.

As described above, discovering the graphic file in which the digital water mark is embedded, the screen saver reports the address of that Web site to the watcher terminal 520 and a predetermined prize money is paid to the discover as a reward by the watcher terminal 520. Accordingly, operating only the screen saver while the contents browser terminal 550 is not in operation, the contents browser terminal 550 comes to attain the predetermined prize money.

As described above, according to the fifth embodiment, there can be obtained such excellent effects as described in the following.

(1) There is no need for the watcher terminal 520 to search all the Web sites on the network by itself. It is enough for the watcher terminal 520 to search only the Web sites based on the information from the contents browser terminal 550, only when the content of that Web site is appropriated.

(2) The content browser terminal 530 can not only prevent the contents from being unfairly appropriated but also use the screen saver as the medium for advertisement. Especially, if an attractive screen saver is prepared, the advertisement effect thereby will be further enhanced.

(3) Operating only the screen saver while the contents browser terminal 550 is not in operation, the contents browser terminal 550 can obtain a predetermined prize money.

(4) As the appropriation detection program exists in the contents browser terminal 550, there can be avoided such a risk that the program is deleted by the contents appropriator terminal 540.

The fifth embodiment has been explained by means of the screen saver system so far. However, the invention is not to be limited to this system, and it is possible to adopt a plug-In system of a Web browser as will be described in the following.

(1) The plug-In of the Web browser examines if the contents are included in a page currently displayed by the browser or not.

(2) If the contents are included, the plug-In examines if the contents protection digital water mark for this contents exists or not.

(3) If detected, the contents are compared with the information of the above contents protection digital water mark (contents creator (name of the business firm), the IP address where the graphic data is to be rightfully made open or the information specifying the URL).

(4) If the URL of the contents of the contents offerer terminal 530 (i.e. the URL included in the contents protection digital water mark as the information to indicate the rightful location where the contents are to be placed) is different from the URL being referred to by the contents browser terminal 550 (i.e. the URL indicating the location where the contents are actually placed), the alarm information AL is transmitted to the watcher terminal 520.

(5) Thereafter, there is executed the same processing as executed in the first through fourth embodiments.

SIXTH EMBODIMENT

The sixth embodiment of the invention will be described in the following with reference to FIG. 9. This embodiment is one of verifications obtainable based on the above-mentioned fifth embodiment and is characterized by that a contents appropriation detection program is incorporated with a provider terminal.

Figure 9:
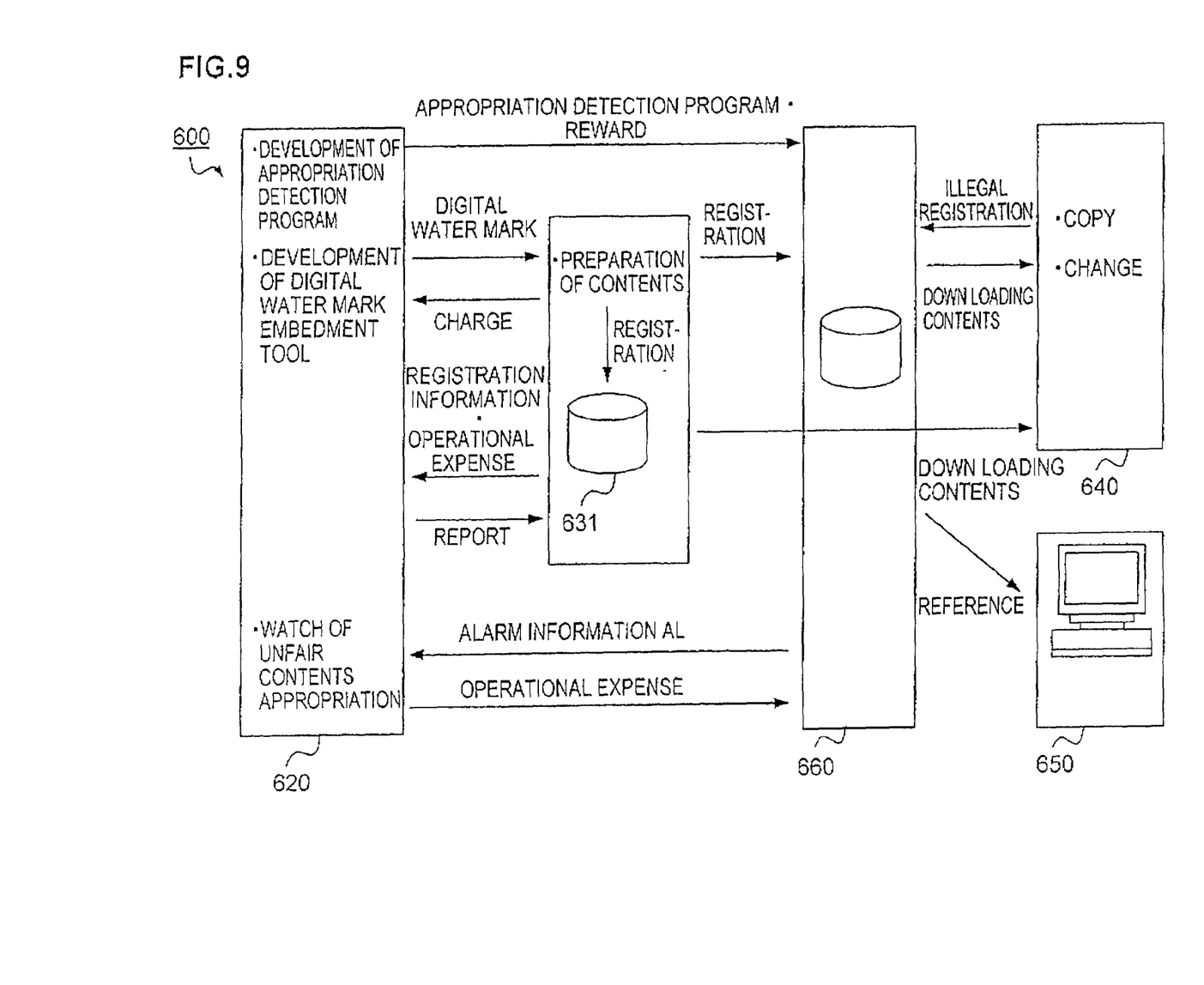
FIG. 9 is a block diagram for explaining the entire constitution of an unfair contents appropriation detection system according to the sixth embodiment of the invention.

Referring to FIG. 9, an unfair contents appropriation detection system (again referred to as "The System" hereinafter) 600 according to this (sixth) embodiment is constituted to include a watcher terminal 620, a contents offerer terminal 630, a contents appropriator terminal 640, and a contents browser terminal 650, In this point, the sixth embodiment is similar to the fifth embodiment. However, the sixth embodiment is characterized in that there is further provided a provider terminal 660. Each of these terminals 620, 630, 640, 650 and 660 is mutually connected with one another through such a network as the internet.

(Watcher Terminal 620)

The watcher terminal 620 develops a tool for embedding the digital water mark in the contents (digital water mark embedment tool), furnishes the contents offerer terminal 630 with this tool, and receives a predetermined charge for this tool from the content offerer terminal 630. The System as shown in FIG. 9 includes only one watcher terminal, but it may be provided with a plurality of watcher terminals corresponding to differences in a method of embedding the digital water mark, for instance, like a watcher terminal for A method, a watcher terminal for B method, a watcher terminal for C method and so forth. In this respect, this embodiment (sixth) is similar to the fifth embodiment as described above.

Furthermore, the watcher terminal 620 develops an appropriation detection program capable of detecting the contents in which the above-mentioned digital water mark is embedded. This appropriation detection program is furnished to the provider terminal 660. If it is detected that the appropriated contents includes the information of the above contents protection digital water mark (contents creator (business firm), the IP address where the graphic data is to be rightfully made open or the information specifying the URL), the contents appropriation detection program displays its function capable of transmitting the alarm information AL to the watcher terminal 620. In this case, the watcher terminal 620 pays a predetermined charge as an operational expense to the provider terminal 660 for contribution of the appropriation detection program furnished thereto as shown in the detection of the unfair content appropriation.

The watcher terminal 620 stores the information of the above contents protection digital water mark (contents creator (business firm), the IP address where the graphic data is to be rightfully made open or the information specifying the URL) and the alarm information AL sent out from the provider terminal 660, and investigates the situation where the contents on the network are copied and/or changed based on the above stored alarm information. If the contents are unfairly changed by the contents appropriator 640, a report to that effect is sent to the contents offerer terminal 630. With the constitution of The System, it becomes unnecessary for the watcher terminal 620 to search the contents on the network all by itself.

(Contents Offerer Terminal 630)

The offerer terminal 630 is a terminal of a business firm who advertises their products, services and so forth with the help of the Web contents prepared by themselves or outside sources. The contents offerer terminal 630 gives the watcher terminal 62 the information of the above contents protection digital water mark (contents creator (business firm), the IP address where the graphic data is to be rightfully made open or the information specifying the URL) to the watcher terminal 620 and requests the watcher terminal 620 to watch the contents with payment of the operational expense therefor.

The contents offerer terminal 630 is furnished with the digital water mark embedment tool by the watcher terminal 620 and pays the charge for that tool to the latter. The contents offerer terminal 630 creates the contents and embeds necessary digital water marks therein with the help of the digital water mark embedment tool and then, registers the contents to its own server 631 and the server (WWW (world wide Web) server) of the provider terminal 660 as well, in order to publicly open the contents to the ordinary contents browser terminal 650. The contents as made public would be down loaded by the ordinary contents browser terminal 550 or by the contents appropriator terminal 640.

(Contents Appropriator Terminal 640)

The contents appropriator terminal 640 down loads the contents as made public by the contents offerer terminal 630. After adding a certain change to the above made open contents, the content appropriator terminal 640 registers the changed contents to an Web server 661 of the provider terminal 660 in order to make public the changed content, the contents appropriator terminal 640 being one of subscribers of the provider terminal 660.

(Contents Browser Terminal 650)

The contents browser terminal 650 is a terminal for down loading and browsing the contents existing on the network.

(Provider Terminal 660)

The provider terminal 660 is a terminal of a firm doing a service business for connecting general network terminals (the contents appropriator terminal and the contents browser terminal) with a network such the internet. To the provider terminal 660, there is furnished the contents appropriation detection program capable of detecting the contents with the above-mentioned digital water mark embedded thereto. This appropriation detection program checks, one after another, the contents as inputted/outputted to/from the provider terminal 660 (i.e. contents uploaded or down loaded) and also, the contents already stored in the provider terminal. Accordingly, the Web sites existing through the world can be checked by means of a lot of provider terminals.

However, it will take considerable time consuming work to verify a tremendous number of the contents as stored in the provider terminal 660 at a time. Accordingly, in order to avoid this time consuming work, a good way to check the contents is at every occurrence of the contents input (writing) to or the contents output (reading) from the provider terminal 660.

An image file with the digital water mark as embedded therein being discovered, the contents appropriation detection program sends a report to that effect to the watcher terminal 620. Then, a predetermined charge is paid to the provider terminal 660 as a reward.

As described above, according to the sixth embodiment, there can be obtained such excellent effects as described in the following.

(1) There is no need for the watcher terminal 620 to search the Web sites on the network all by itself. It is enough for the watcher terminal 620 to search only the Web site based on the information from the provider terminal 660, only when the contents are appropriated.

(2) The content browser terminal 630 can prevent the contents from being unfairly appropriated.

(3) As the appropriation detection program exists in the provider terminal 660, there can be avoided such a risk that the contents appropriation protection program is deleted by the contents appropriator terminal 640.

(4) Even if the unfair contents appropriation takes place, the provider terminal 660 would not be accused of being responsible for occurrence of such unfair contents appropriation.

(5) If the provider terminal 660 executes verification of the contents at every occurrence of the contents input (written in) to or the contents output (read out) from the provider terminal 660, there would be no need for a great number of the contents stored in the provider terminal 660 to be verified at a time, and the work load for verifying the contents would be reduced to a great extent as a whole, comparing with the case where the verification of some contents coming in (written in) or coming out (read out)

from the provider terminal 660 and the verification of the contents stored in the same are executed at intervals as are thought suitable.

The System and peripheral techniques related thereto according to the invention have been discussed so far by way of several exemplary examples and with reference to the accompanying drawings, but the invention should not be limited to these examples. It is apparent that one who is skilled in the art may make various variation or modification of the invention within the category of the technical thoughts as recited in the scope of claims for patent attached hereto. It is understood that such variation or modification naturally belongs to the technical scope of the invention.

For instance, the well known Active X control is an example of the contents appropriation detection program as used in the first embodiment according to the invention. Also, the above program can be realized by using the JAVA applet.

Furthermore, the first embodiment according to the invention explains about the case where the contents appropriator 120 up loads the contents offered by the contents offerer terminal 110 to the Web server 121 owned by the appropriator itself. However, the invention is not limited to the above case as explained. The invention is applicable to the case where the contents appropriator terminal 120 makes public the contents through the internet provider.

Still further, according to the invention, the load of the watcher terminal watching the contents appropriation is reduced while the watching efficiency of the contents appropriation is enhanced, thereby the prevention of the contents appropriation being made more complete and reliable.

Still further, according to the other aspect of the invention, the following excellent effects are obtained. That is, the watcher terminal is able to enhance the watching efficiency of the contents appropriation by incorporating the contents appropriation detection program into the screen saver. The contents offerer terminal is able to make use of the screen saver as advertisement medium. The contents browser terminal is able to obtain the prize money by operating only the screen saver while the contents browser terminal is not in operation.

What is claimed is:

1. An unfair contents appropriation detection system comprising:
   a contents offerer terminal offering contents;
   a contents appropriator terminal obtaining and appropriating the contents offered by said contents offerer terminal;
   a contents browser terminal obtaining and browsing the contents offered by said contents offerer terminal and/or the contents appropriated by said contents appropriator terminal and transmitting a predetermined alarm information when obtaining the contents appropriated by said contents appropriator terminal, wherein a digital water mark for obtaining changed area information of the contents is embedded in the contents obtained by said contents browser terminal; and
   a watcher terminal detecting the contents appropriation executed by said contents appropriator terminal based on the predetermined alarm information transmitted from said contents browser terminal, and if the appropriated contents are unfairly changed, sending a report to said contents offerer terminal,
   wherein if said contents browser terminal obtains the contents appropriated by said contents appropriator terminal, a contents appropriation detection program incorporated into the appropriated contents transmits the predetermined alarm information, wherein the changed area information identifies a location of a change in the contents to said watcher terminal, said contents appropriation detection program having the function of verifying the digital water mark and including the changed area information of the contents in said alarm information.

2. The system as claimed in claim 1 wherein said watcher terminal obtains the contents from said contents appropriator terminal based on the changed area information and executes character recognition processing with respect to the contents as obtained.

3. The system as claimed in claim 2 wherein words and phrases with a high possibility of being used in the changed contents are registered in advance in a dangerous words database and it is verified whether or not the words and phrases obtained by the character recognition processing coincide with those which are registered in said dangerous words database.

4. An unfair contents appropriation detection system comprising:
   a watcher terminal developing a digital water mark embedment tool for embedding a digital water mark in contents and developing a screen saver preparation tool for making a screen saver capable of detecting digital water mark embedded contents, said screen saver capable of identifying changed area information of the contents;
   a contents offerer terminal receiving said digital water mark embedment tool from said watcher terminal to offer the contents in which said digital water mark is embedded, and receiving the screen saver preparation tool from said watcher terminal to prepare the screen saver;
   a contents appropriator terminal obtaining and appropriating the contents offered by said contents offerer terminal; and
   a contents browser terminal obtaining and browsing the contents offered by said contents offerer terminal and/or the contents appropriated by said contents appropriator terminal, and receiving the screen saver from said contents offerer terminal to start up the screen saver,
   wherein said screen saver accesses in sequence the contents made open to a network to detect said digital water mark embedded contents and to transmit a predetermined alarm information including the changed area information of the contents to said watcher terminal, wherein the changed area information identifies a location of a change in the contents.

5. A computer program stored in a contents browser terminal implementing a screen saver and to gain access in sequence to contents made open to a network to detect the contents having an embedded digital water mark for obtaining changed area information of the contents and transmitting a predetermined alarm information to a watcher terminal, the computer program having the function of verifying the digital water mark and including the changed area information of the contents in said predetermined alarm information wherein the changed area information identifies a location of a change in the contents.

6. An unfair contents appropriation detection system comprising:
   a watcher terminal developing a digital water mark embedment tool for embedding a digital water mark to the contents and developing an appropriation detection program capable of detecting said digital water mark embedded contents, said appropriation detection program capable of identifying changed area information of the contents;

a contents offerer terminal receiving said digital water mark embedment tool from said watcher terminal to offer said digital water mark embedded contents;

a contents appropriator terminal obtaining and appropriating said digital water mark embedded contents offered by said contents offerer terminal;

a provider terminal storing and providing said digital water mark embedded contents offered by said contents offerer terminal and said appropriated contents appropriated by said contents appropriator terminal, and receiving and incorporating the appropriation detection program from said watcher terminal; and a contents browser terminal obtaining and browsing said digital water mark embedded contents offered by said contents offerer terminal, wherein said appropriation detection program detects the contents with the digital water mark as embedded therein from among the contents inputted to and outputted from said provider terminal or the contents stored in said provider terminal, and transmits a predetermined alarm information including the changed area information of the contents to said watcher terminal, wherein the changed area information identifies a location of a change in the contents.

7. An unfair contents appropriation detection system comprising:

a contents offerer terminal offering contents;

a contents appropriator terminal obtaining and appropriating the contents offered by said contents offerer terminal;

a contents browser terminal obtaining and browsing the contents offered by said contents offerer terminal and/or the contents appropriated by said contents appropriator terminal and transmitting a predetermined alarm information when obtaining the contents appropriated by said contents appropriator terminal, wherein a digital water mark for obtaining changed area information of the contents is embedded in the contents obtained by said contents browser terminal; and a watcher terminal detecting the contents appropriation executed by said contents appropriator terminal based on the predetermined alarm information transmitted from said contents browser terminal, and if the appropriated contents are unfairly changed, sending a report to said contents offerer terminal, said watcher terminal obtaining the contents from said contents appropriator terminal based on said alarm information and carrying out verification of the digital water mark with regard to the contents from said contents appropriator terminal, wherein if said contents browser terminal obtains the contents appropriated by said contents appropriator terminal, a contents appropriation detection program incorporated into the appropriated contents transmits the predetermined alarm information including the changed area information of the contents to said watcher terminal, wherein the changed area information identifies a location of a change in the contents.

\* \* \* \* \*